US006601333B2

(12) United States Patent
Cicoff et al.

(10) Patent No.: US 6,601,333 B2
(45) Date of Patent: Aug. 5, 2003

(54) REMOTE CONTROLLED GAME DECOY AND GAME RETRIEVER

(76) Inventors: George Cicoff, 203 N. 44th Ct., Greeley, CO (US) 80634; Mark Cicoff, 12560 E. Warren Dr.-Unit D, Aurora, CO (US) 80014

( * ) Notice: Subject to any disclaimer, the term of this patent is extended or adjusted under 35 U.S.C. 154(b) by 0 days.

(21) Appl. No.: 09/970,407

(22) Filed: Oct. 2, 2001

(65) Prior Publication Data

US 2003/0061754 A1 Apr. 3, 2003

(51) Int. Cl.⁷ ............................................... A01M 31/06
(52) U.S. Cl. ...................................................... 43/2; 43/3
(58) Field of Search ............................ 43/2, 3, 26.1, 1; 446/154, 156, 157, 158, 163

(56) References Cited

U.S. PATENT DOCUMENTS

| | | | |
|---|---|---|---|
| 2,814,146 A | | 11/1957 | Propp |
| 2,835,064 A | | 5/1958 | Webb |
| 3,000,128 A | | 9/1961 | McAda |
| 3,026,545 A | * | 3/1962 | Brainard, II |
| 3,074,195 A | | 1/1963 | Vanderpool |
| 3,689,927 A | | 9/1972 | Boston |
| 4,020,777 A | * | 5/1977 | Brown et al. ............... 114/258 |
| 4,322,908 A | * | 4/1982 | McCrory ......................... 43/3 |
| 4,536,985 A | * | 8/1985 | Caviness ..................... 43/17.6 |
| 4,545,315 A | * | 10/1985 | Becherer ................... 114/61.1 |
| 4,856,222 A | * | 8/1989 | Hannam ..................... 43/26.1 |
| 5,165,193 A | * | 11/1992 | Dankwardt ................. 43/26.1 |
| 5,289,654 A | * | 3/1994 | Denny et al. ................... 43/2 |
| 5,367,813 A | * | 11/1994 | Cherry ............................ 43/2 |
| 5,377,439 A | | 1/1995 | Roos et al. |
| 5,636,466 A | | 6/1997 | Davis |
| 5,700,170 A | * | 12/1997 | Mataya ........................ 440/47 |
| 5,930,936 A | | 8/1999 | Parr et al. |
| 6,339,894 B1 | * | 1/2002 | Solomon ......................... 43/3 |
| 6,357,161 B1 | * | 3/2002 | Best ................................. 43/3 |
| 6,389,732 B1 | * | 5/2002 | Daniel ........................... 43/4.5 |
| 6,463,690 B1 | * | 10/2002 | Wood et al. ..................... 43/2 |

FOREIGN PATENT DOCUMENTS

| | | | |
|---|---|---|---|
| GB | 2088226 | * | 6/1982 |
| JP | 5-95750 | * | 4/1993 |

* cited by examiner

Primary Examiner—Peter M. Poon
Assistant Examiner—David J Parsley
(74) Attorney, Agent, or Firm—Sheridan Ross P.C.

(57) ABSTRACT

A remote controlled game decoy is provided that includes a number of functional components allowing an operator to control the game decoy for varied operations. The gamed decoy is self-propelled. Propulsion may be achieved either by a motor driven propeller or by a jet propulsion system. A rudder may be provided with the propeller to enhance mobility of the decoy. The jet propulsion system incorporates a pump which forces a flow of liquid to exit the decoy. The flow of liquid can be accelerated and directionally controlled by a nozzle placed in-line with the exiting flow of liquid. A retrievable anchor may be employed to station the decoy at a desired location. A gamed retrieval device may also be provided to retrieve downed game. In one arrangement, a retrievable snare or hook is used to retrieve downed game. In another arrangement, a plurality of retractable/extendable tines are used to retrieve downed game.

19 Claims, 5 Drawing Sheets

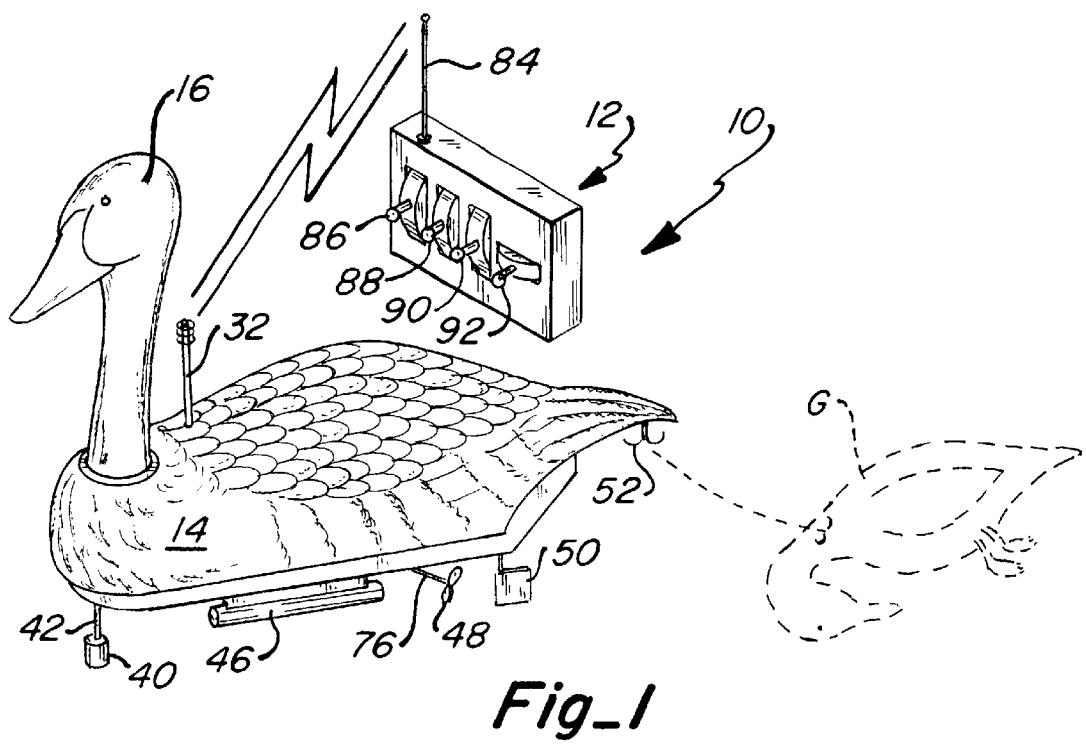
Fig_1
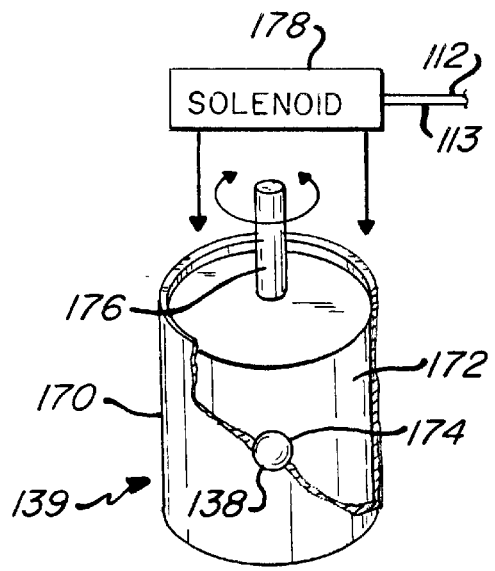
Fig_7

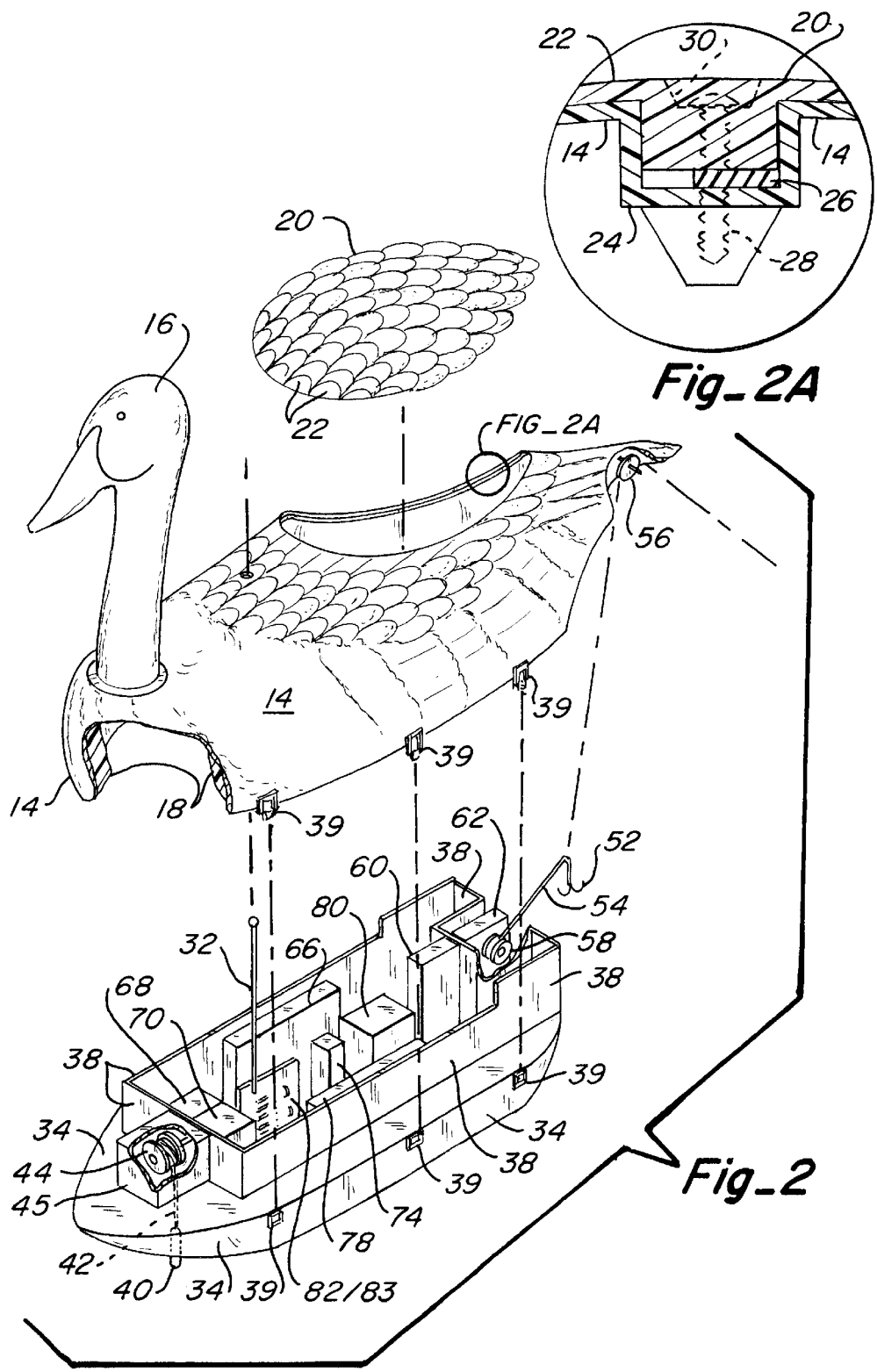

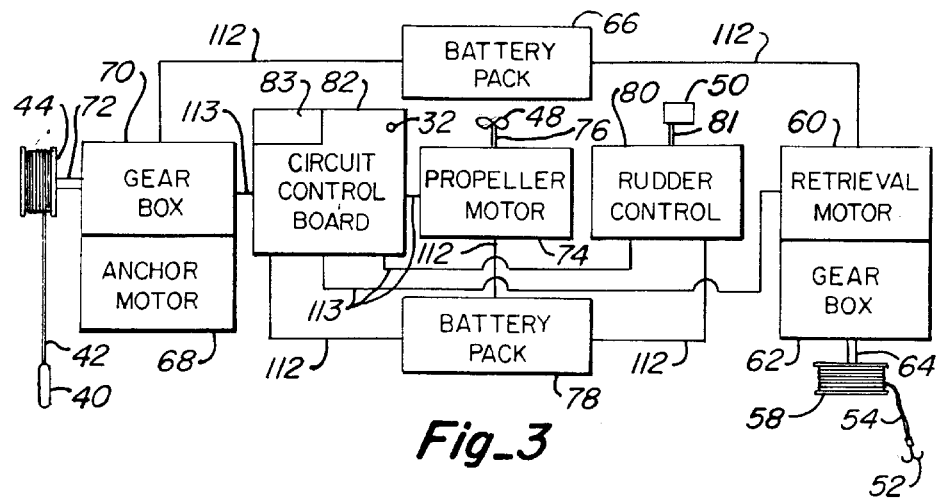
Fig_3
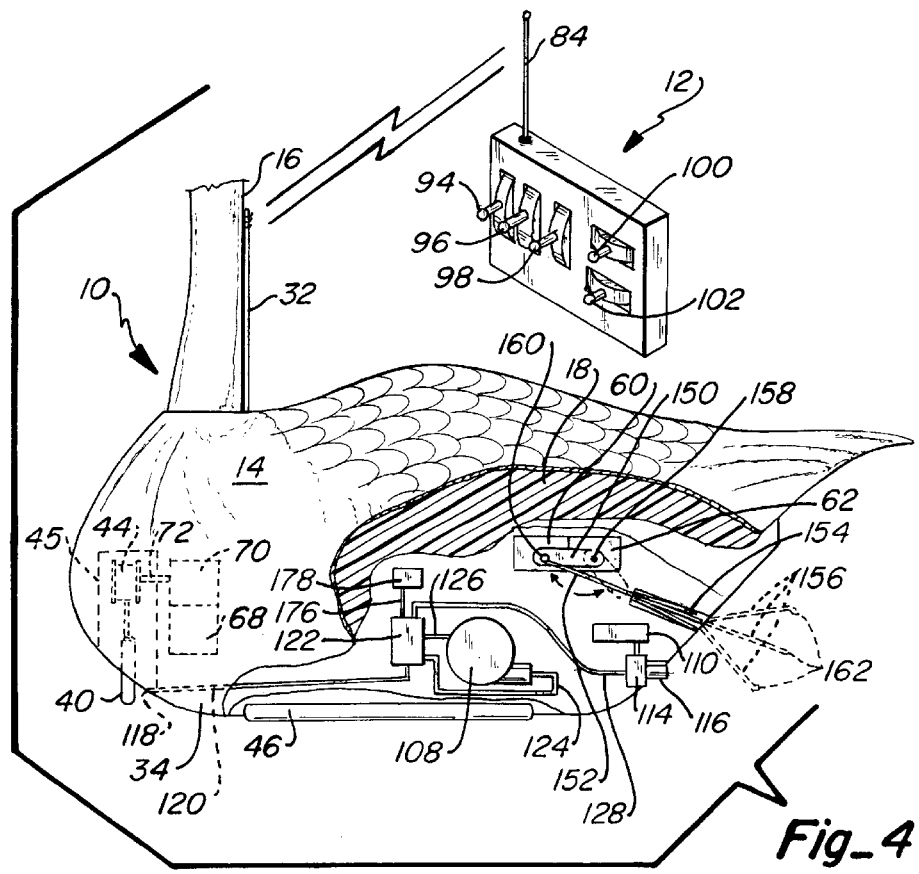
Fig_4

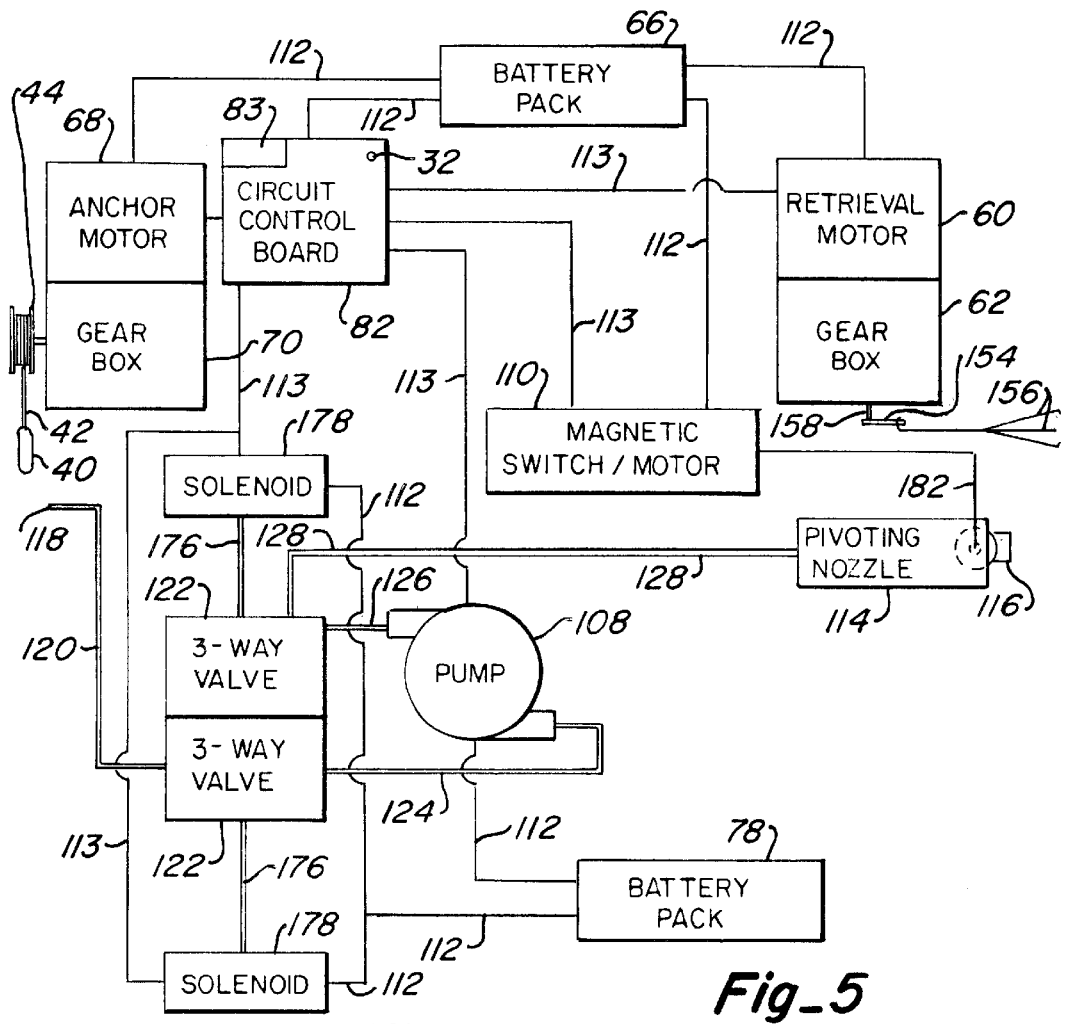
*Fig_5*
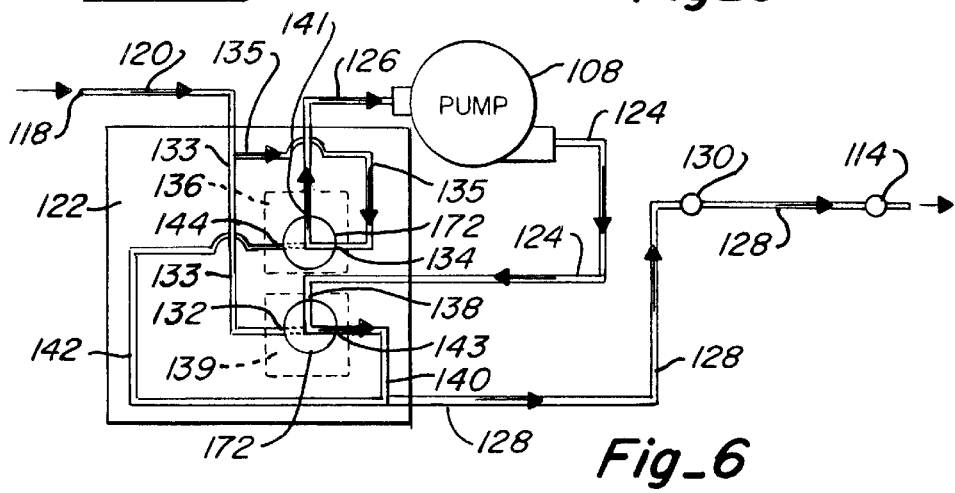
*Fig_6*

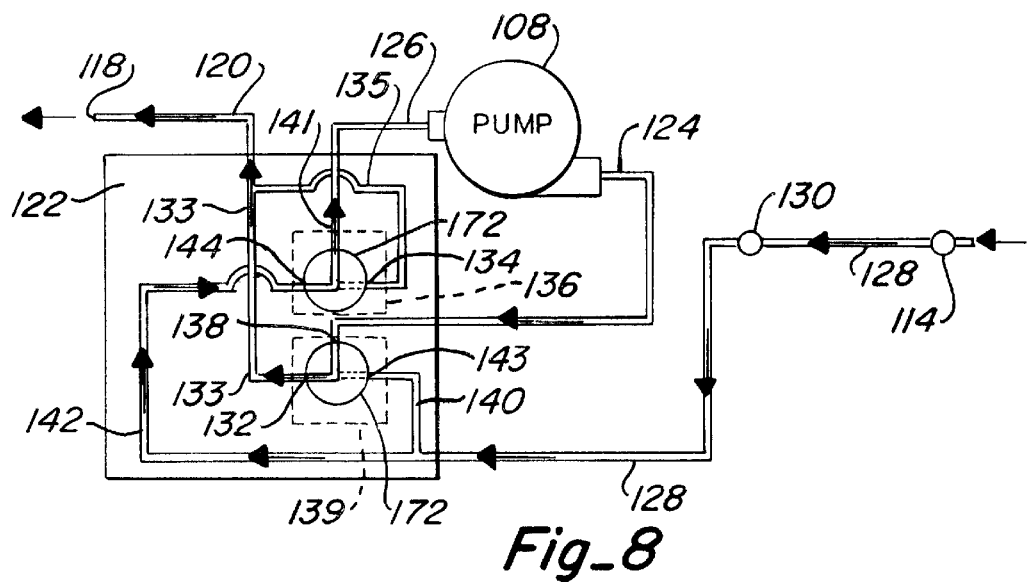
Fig_8
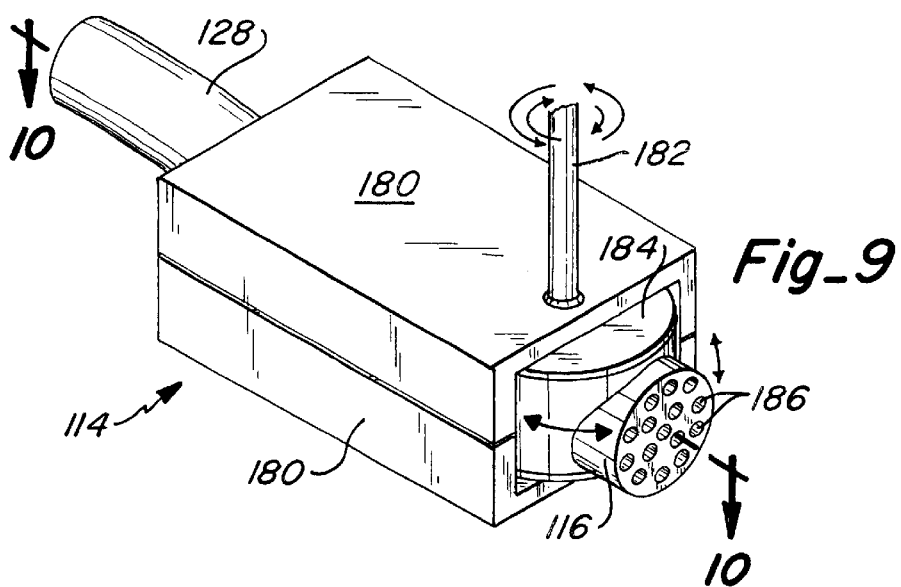
Fig_9
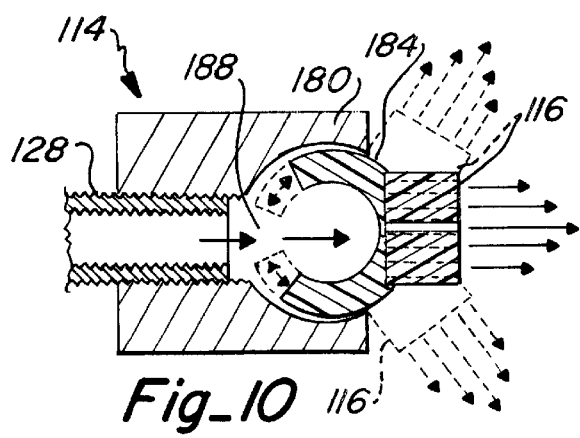
Fig_10

REMOTE CONTROLLED GAME DECOY AND GAME RETRIEVER

FIELD OF THE INVENTION

This invention relates to a remote controlled game decoy. More particularly, the present invention relates to a remote controlled game decoy having a number of functional components which can all be remotely operated. The game decoy is self-propelled and has some integral means to retrieve downed game.

BACKGROUND OF THE INVENTION

Game decoys of many varieties are used as lures for hunting, and are employed to emulate water fowl or a group of water fowl at a location suitable for water fowl habitat. Ideally, water fowl are attracted to a group of decoys, and the water fowl come within range of shooting by the hunter. The hunter may personally retrieve the downed game, or use a working dog to retrieve the downed game. To a lesser extent, decoys are used as lures to attract wild animals for observation, or to capture an animal for tagging, study, or other biological purposes. Whether it be hunting or other activities, it is most desirable to provide a game decoy which not only lures the animal, but also captivates it and keeps it occupied in a designated location.

A number of prior art devices exist which include improvements to game decoys. A number of these devices are focused upon providing internal propulsion for the game decoy, thus making it more lifelike and natural. Furthermore, these self-propelled decoys allow a hunter/observer to more precisely position the game decoy, as well as change the position of the decoy without necessarily having to physically move to position the game decoy. Accordingly, many of the prior art devices are remote controlled, allowing the hunter/observer much flexibility in employment of the game decoy.

In addition to providing means for propelling the game decoy and a radio transmitter/receiver for remote control, some of the prior art devices include remote controlled anchors, and devices which are designed to retrieve the downed game by snaring or otherwise attaching the downed game to the game decoy, and then retrieving the game decoy.

While the prior art devices may be adequate for their intended purposes, there are some inherent drawbacks with many of the designs incorporated in such prior art devices. One common problem related to use of providing self-propulsion for the game decoy is that the propulsive mechanism may become fouled with weeds, algae, pond scum, or other obstacles as the decoy is being propelled through a particular area. This may result in stalling or complete loss of the decoy, or at a minimum can result in erratic motion atypical of the animal which is simulated by the decoy.

Another common problem associated with many prior art devices is that they are unnecessarily complex in employment of the various functioning components of the device, as well as the overall basic design of these components.

Therefore, one object of the present invention is to provide a game decoy with multiple functions, but simplify its construction and design. Another object of the invention is provide options for propulsion of the game decoy, which includes a jet powered system or arrangement which minimizes fouling of the propulsion device in austere water environments. It is yet another object of the invention to provide a game retrieval mechanism which simply yet reliably can retrieve downed game. Yet another object of the invention is to provide a floatable container which houses the functional elements of the decoy, and a separable body or shell attached to the floatable container wherein the particular shape of the game being simulated can be easily interchanged by using a different shell.

It is still another object of the invention to provide methods which employ the functional components of the apparatus, thus constituting overall improvements in the methods of propelling the decoy, retrieving game, simulating game, and controlling the game decoy.

SUMMARY OF THE INVENTION

In accordance with the preferred embodiment of the invention, a remotely controlled decoy is provided comprising a buoyant shell or body portion, and a buoyant boat-like container which houses the functional components of the decoy therein. The decoy is controlled by wireless communications. A common hand held radio transmitter generates control signals, and a radio receiver which is housed within the decoy receives the radio signals. The receiver then generates electric control signals in conjunction with onboard circuitry within the decoy to control the various functional components of the decoy. The components of the decoy include a propulsive device, either in the form of a traditional propeller, or in the form of jet propulsion which incorporates a directional nozzle generating accelerated liquid flow for propulsion and for steering. A weight may be used in the bottom of the decoy to aid in stabilizing the decoy. Alternately, a rudder is provided to stabilize the decoy and increase maneuverability. The propulsive device in either form provides precisely directed movement of the decoy in response to commands transmitted by the transmitter.

The remotely controlled decoy also includes an optional anchor having a spool and a length of line or cable wound around the spool. The spool is controlled by an anchor motor coupled to the spool. The anchor motor unwinds the spool enabling the anchor to be dropped, and the motor rewinds the spool in order to raise the anchor.

A game retrieval mechanism is also incorporated within the decoy. In a first arrangement of the game retrieval mechanism, a treble hook or other snaring implement is attached to a retractable line or cable, which is secured upon a spool. Like the anchor, the game retrieval mechanism in the first arrangement also includes a motor coupled to the spool which allows winding and unwinding of the spool in order to release or retract the game retrieval hook. In addition to retrieving game, the game retrieval hook can also be used for towing slave decoys. Thus, the spool is simply unwound to extend the line to a desired distance from the decoy, and the slave decoys are secured to the game retrieval hook. In a second arrangement of the game retrieval mechanism, an extendable/retractable set of tines are provided which have hooked ends for snaring downed game. A retrieval motor is also provided for actuating the tines to an extended or retracted position. In the retracted position, the tines are withdrawn into a holding sleeve. The tines are pushed or displaced out of the holding sleeve in the extended position, the tines being normally biased to spread or separate from one another while in the extended position.

In order to provide nearly instantaneous forward or reverse locomotion, a dual three-way valve is used in conjunction with the jet propulsion arrangement. A pump provides a flow of liquid through the decoy, and the nozzle accelerates the exiting fluid to provide effective jet propulsion to the decoy. The dual three-way valve may be controlled to reverse the flow of liquid through the decoy, thus resulting in reversal in the direction of movement of the decoy. The dual three-way valve has two control sections or chambers with rotatable drums/cylinders operated by corresponding solenoids which set the drums for either forward or reverse movement of the decoy. It is also contemplated within the spirit and scope of this invention to alternatively use a reversible pump motor which would in turn reverse the direction of the pump, and subsequently the flow of liquid through the decoy. However, the preferred arrangement is the use of the dual three-way valve which more instantaneously reverses direction of flow through the decoy.

The transmitter is designed to have separate controls for each of the different decoy functions. These controls can be in the form of toggle switches which enables an operator to quickly, efficiently, and independently control each of the functioning elements.

Further and more specific advantages and features of the invention will become apparent to those skilled in the art from the following detailed description, taken in conjunction with the drawings.

BRIEF DESCRIPTION OF THE DRAWINGS

FIG. 1 is a perspective view of the game decoy of the present invention, and a transmitter which may be used to transmit control signals to the game decoy;

FIG. 2 is an exploded perspective view illustrating the shell or body portion of the game decoy separated from the base unit which houses the functional components of the decoy, and further showing the removable access cover;

FIG. 2A is a greatly enlarged sectional view of the manner in which the access cover is attached and sealed with respect to the shell of the game decoy;

FIG. 3 is a schematic diagram illustrating the functional components of the game decoy, this schematic view being for purposes of illustrating functional relationships and capabilities;

FIG. 4 is a fragmentary side view of a second embodiment of the game decoy of this invention, illustrating some of the functional components of the embodiment, and a modified transmitter which may be used to transmit the control signals to accommodate the components in the second embodiment;

FIG. 5 is a schematic diagram of the functional components of the second embodiment;

FIG. 6 is a schematic diagram illustrating the flow of liquid through the propulsive device of the second embodiment;

FIG. 7 is a combined schematic and greatly enlarged fragmentary perspective view of the internal construction of a part of the dual three-way valve incorporated within the second embodiment;

FIG. 8 is another schematic diagram illustrating reverse flow of liquid through the propulsive device of the second embodiment;

FIG. 9 is a perspective view of the nozzle assembly used in the second embodiment to generate the accelerated exiting liquid; and FIG. 10 is a horizontal section, taken along line 10—10 of FIG. 9 illustrating the operation of the nozzle assembly which can be rotated for directional control of the decoy.

DETAILED DESCRIPTION OF THE INVENTION

Turning now to the drawings, in which like reference characters indicate corresponding elements throughout the several views, the description is first directed to FIG. 1 which illustrates a remotely controlled game decoy 10, and a transmitter 12 which generates control signals. As further discussed below, a receiver mounted within the decoy receives the transmitted signals, and conditions the received signals in conjunction with control circuitry also mounted within the duck decoy for control of the various functional components. The transmitter 12 may be a conventional radio control transmitter such as that used with model airplanes and model automobile racers.

A receiving antenna 32 is mounted on the body 14, and is electrically coupled to the radio receiver within the body. As shown in FIG. 4, receiving antenna 32 is preferably positioned adjacent head portion 16 in order to aid hiding antenna 32. A user or operator controls the decoy by manipulating one or more of the toggle switches of the transmitter. The signals are received by antenna 32, and then the receiver decodes and distributes the received control signals to the corresponding functional components within the decoy 10. While radio signals are the preferred means of communication between the transmitter and receiver, it would also be appreciated by those skilled in the art that other remote transmission protocols may be used including, but not limited to, infrared links, sonic or ultrasonic links.

Turning now to FIG. 2, the body or shell 14 of the decoy includes a head portion 16; thus the decoy may resemble water fowl such as a duck or goose. A number of commercially available decoys may be modified for use as the shell/body 14. Preferably, the shell 14 is a relatively dense stiff material, which overlies an interior foam layer 18. The foam layer results in the shell 14 being buoyant. An access cover 20 is provided to allow the user/operator to access the internal working components of the decoy for repair and troubleshooting. The access cover 20 is preferably disposed on an upper portion or surface of the shell 14, and includes an overhanging edge 22 which effectively hides the joint between the cover 20 and the shell 14.

As shown in FIG. 2A, an inner flange 24 is formed integrally along the opening, and a compressible gasket 26 overlies the lower surface the interior flange 24 along the entire periphery of the flange 24. At one or more selected locations along the flange 24, a screw 28 may be used to join the access cover 20 to the shell 14. In order to hide the head of the screw, a recess or countersink 30 may be formed in the edge 22. Compressible gasket 26 provides a water tight seal once the screws 28 are in place.

A base unit is provided which includes a hull 34 and a container. As shown in FIG. 2, the hull 34 resembles a single-hull boat. Alternately, a catamaran-shaped hull 34 may be used where there are two skids or separated sections of the hull 34. For a multiple-piece shell 14 construction decoy, the container includes a lower wall portion that is interconnected to sidewalls 38 which are mounted over the hull 34. The container houses the functional components of the game decoy therein. The under side of the shell 14 is large enough to receive the container therein. Preferably, there is a tight conforming fit between the foam layer 18 and the exterior sides of walls 38. Furthermore, a compressible gasket or other sealing material (not shown) may be used, either mounted on the interior surface of foam layer 18 or on the exterior surface of walls 38 in order to provide an effective water tight seal. Complimentary securing means 39 are provided on the shell 14 and on the hull 34 which allows the shell 14 to be removably secured to the base unit. These securing means may include buckles, snaps or other well-known securing means. More preferably, a single- or one-piece type of sealed body construction is employed to limit the potential for water to enter the body of the decoy. In this case, an access cover 20 would still be employed above the water line of the decoy to allow access to the various decoy components Optionally, an anchor assembly may be used to anchor the decoy at a desired location. As shown in FIGS. 2 and 3, the anchor assembly includes an anchor weight 40 attached to the free end of a cable/line 42 which is wound upon spool 44. Anchor spool 44 is preferably positioned within a hull opening 45 formed within the hull 34 of decoy 10. Spool 44 may be selectively wound or unwound to retract/drop the anchor 40. Shaft 72 interconnects spool 44 with gear box 70. Anchor motor 68 drives the shaft 72 via gear box 70. Although FIG. 3 illustrates gear box 70 as a separate element from anchor motor 68, it shall be understood that gear box 70 simply represents the desired gearing or output from anchor motor 68 which is advantageous for operating shaft 72. As well understood by those skilled in the art, a particular anchor motor 68 could be selected which has the desired speed and torque for shaft 72, or a separate gear box 70 may be mechanically linked to the output of anchor motor 68 to adjust or modify the torque and speed of shaft 72. Anchor motor 68 is reversible which allows spool 44 to be wound or unwound. In addition, a limit or control switch is preferably incorporated into the anchor spooling mechanism to prevent too much winding or unwinding of the spool 44.

Referring back to FIG. 1, a weighted keel 46 may be positioned at the underside of the decoy 10. The weighted keel 46 provides needed weight and stability, thus ensuring that the game decoy maintains its upright position. Depending upon the weight of the game decoy, weighted keel 46 is optional and can be eliminated if found unnecessary. As shown in FIG. 4, the weighted keel 46 may also be recessed within the hull 34 thus providing a more streamlined arrangement. Therefore, a weighted keel 46 may take the form of an exterior projection, or alternately, it may take the form of a weight added to the bottom interior and/or exterior surfaces of the hull 34

In order to propel the game decoy in the first embodiment, a propeller 48 is utilized which extends into the water, and is centrally located with respect to the hull 34. Directional control (left and right) may be achieved by use of a rudder 50 which is mounted adjacent the propeller 48 and also extends into the water.

A game retrieval mechanism may be incorporated to retrieve downed game, or to tow slave decoys. In a first arrangement, the game retrieval mechanism includes a treble hook, snare, or other hook like implement 52 which is attached to a length of cable or line 54. The hook 52 snares a downed game G as shown in FIG. 1. The line 54 is routed over an exterior pulley 56 which is mounted or otherwise recessed underneath the tail portion of the shell 14, as shown in FIG. 2. The line is then secured around spool 58 which is recessed within the container. As with the anchor spool 44, the retrieval mechanism spool 58 is rotatable in either direction to wind or unwind line 54. In a manner similar to the anchor spool 44, a limit or control switch is preferably integrated into the retrieval mechanism spool 58 to prevent too much winding or unwinding. As shown in FIG. 2 and schematically within FIG. 3, a shaft 64 interconnects spool 58 with gear box 62. Retrieval motor 60 drives shaft 64 via gear box 62. As with gear box 70, gear box 62 is optional and is illustrated for purposes of acknowledging that the output of retrieval motor 62 may be varied to achieve the desired speed and torque upon shaft 64. The positions of the anchor spool 44 and the game retrieval spool 58 may be located at either the front or back of decoy 10.

One or more sources of power may be provided in the form of battery packs 66 and 78. Battery packs 66 and 78 may be conventional lithium-ion batteries, or other well-known dry-cell batteries which provide adequate amperage and voltage to power the components of the decoy. Preferably, these battery packs are rechargeable and are easily replaced by the operator opening access cover 20. As illustrated, electrical lines 112 interconnect the battery pack with the particular functional components requiring electrical power.

Now returning to a description of propulsion via propeller 48, a propeller motor 74 is provided which drives the propeller 48 via shaft 76. As with the anchor motor 68 and retrieval motor 60, the propeller motor 74 may optionally include a gear box (not illustrated), or other traditional gearing means which can control the speed and torque of the shaft 76. Preferably, propeller motor 74 is reversible, enabling the operator to select either forward or reverse movement.

Means are also provided to control the rudder 50. As shown schematically in FIG. 3, a rudder control 80 is provided which rotates shaft 81 through a desired arc in order to position rudder 50 in the desired angular orientation. Rudder control 80 may simply be another motor which provides selective rotation of shaft 81.

Referring again to FIG. 3, a circuit control board 82 with accompanying RF receiver 83 electrically communicates with each of the motors/controls. Communication lines 113 simply illustrate that appropriate electrical control signals are sent to each of the motors/controls based upon input from the operator via transmitter 12. As discussed above, RF receiver 83 receives the command signals via antenna 32, and then circuitry within board 82 conditions and distributes the control signals to the appropriate component to be controlled.

Now providing an explanation of basic operation, the user/operator places the decoy 10 in the desired body of water. The user/operator manipulates the control unit 12 and transmits radio signals via antenna 84 to the decoy. A number of toggle switches/controls are provided with the control unit 12 to independently operate each of the components. As shown in FIG. 1, control 86 is a toggle switch for controlling forward and reverse movement of the decoy by corresponding forward/reverse rotation of the propeller 48. Toggle switch 88 allows extension or retrieval of the retrieval implement 52, by rotation or counter rotation of spool 58. Toggle switch 90 controls the up or down movement of anchor 40, by corresponding rotation/counter-rotation of spool 44. Horizontally oriented toggle switch 92 allows left/right rudder control for manipulating the angular position of the rudder 50.

Now referring to a second embodiment of the invention, illustrated in FIGS. 4 and 5, in lieu of a propeller propulsion means and a spool controlled hook for game retrieval, the second embodiment incorporates jet power for propulsion, and retractable grasping tines for game retrieval. Pump 108 may be any well known bilge pump which has an inlet for receiving a flow of liquid, and an outlet which provides a pressurized flow of liquid. Pump 108 communicates with nozzle 114 through dual three-way valve 122. Nozzle 114 provides additional acceleration of liquid for locomotive force, and dual three-way valve 122 enables forward or reverse flow of fluid through the decoy, as further discussed below. For forward movement of the decoy, water is allowed to enter inlet 118, which is located preferably toward the lower front edge of the hull 34. Of course, inlet 118 is placed at a level below the water line to ensure a constant stream of liquid is available. Now also referring to FIG. 6, inlet 118 communicates with inlet line 120, which provides a flow of fluid into valve 122. Liquid exits valve 122 through line 128. Line 128, in turn, provides a flow of liquid through nozzle 114. Fluid then exits the nozzle at an accelerated rate, providing the forward locomotive motion for the decoy. Optionally, a ball valve 130 may selectively restrict the amount of flow through the jet propulsion system.

Referring now specifically to FIG. 6, the flow of liquid through the jet propulsion system will be described. Fluid enters the valve through line 120. Line 120 then splits into branch line 133 and branch line 135. For forward movement, branch line 135 is open wherein entrance/exit port 134 allows fluid to flow into the first control assembly 136. Branch line 133 is blocked at entrance/exit port 132, because the second control assembly 139 is positioned to prevent flow through port 132. After entering first control assembly 136, liquid then flows out of this control assembly through intermediate line 126, through pump 108, through second intermediate line 124, and into the second control assembly 139 through entrance/exit port 138. Flow then exits the second control assembly 139 through entrance/exit port 143, and then travels through line 140 and into line 128. Liquid also has the option of flowing into branch line 142; however, entrance/exit port 144 is blocked preventing further flow of fluid into the first control assembly 136. Directional arrows are provided illustrating the flow of liquid. If it is desired to reverse the direction of the decoy, the operator manipulates the toggle switch 94 to cause reverse flow of liquid through the jet propulsion system. Specifically, the first and second control assemblies are rotated to a second position which reverses flow through the system. As shown in FIG. 7, the first and second control assemblies 136 and 139 each include a rotatable drum or cylinder 172 with passageways formed therein which align with the desired entrance/exit ports. More specifically, the valve 122 includes two rounded internal surfaces or casings 170 which each receive therein a corresponding rotatable cylinder 172. As an example, FIG. 7 illustrates one of the cylinders 172 wherein inlet/exit port 138 is aligned with internal passageway 174 which is formed on the rotatable cylinder 172. The internal passageways 174 for each cylinder are L-shaped passageways. Each cylinder 172 includes an operating shaft 176 which communicates with a corresponding solenoid 178. Power and control wires 112 and 113 electrically communicate with solenoids 178. Electrical command signals generated through the control circuitry cause the solenoids to rotate the corresponding cylinders 172 to the desired position.

Now referring to FIG. 8, reverse flow is illustrated wherein solenoids operating the shafts 176 rotate the shafts to cause the cylinders 172 to align their respective passageways 174 for reverse flow. The directional arrows in FIG. 8 illustrate the specific path in which fluid takes through the propulsion system. Thus, for reverse movement, fluid exits the decoy through opening 118, and fluid enters the game decoy through the nozzle 114. Of course, there is some reduced capacity in locomotive force provided when the operator selects the reverse position. The flow of fluid through the system is inherently reduced because of the constriction created by nozzle 114, and there is no additional acceleration of fluid because it simply exits through the opening 118.

Thus, there are simply two positions for the cylinders. For cylinder 139, one position allows liquid to enter through port 138 and exit through port 143 (FIG. 6, forward movement), and the other position allows liquid to enter port 138, and exit through port 132 (FIG. 8 reverse movement). For cylinder 136, one position allows liquid to enter through port 134 and exit through port 141 (FIG. 6, forward movement), and the other position allows liquid to enter port 144 and exit through port 141 (FIG. 8, reverse movement).

It is also contemplated that a pump motor mounted within the container may drive a shaft via a pump gear box. The shaft would be mechanically linked to the pump. Here, the torque and speed of the shaft could be varied by either a separate gear box, or a particular motor having an output of the desired torque and speed.

Referring back to FIG. 4, the alternative arrangement of the game retrieval mechanism in the second embodiment involves the use of flexible grasping tines/prongs 156 which are retracted within sleeve 154 when not in use, and may be extended as shown in the phantom lines to allow grasping or contact with downed game. The proximal end of the grasping tines 156 connect to control rod 152, which in turn, rotatably connects to cam 150 at pinned connection 160. As shown schematically in FIG. 5, control shaft 158 from gear box 62 allows rotation of cam 150 to extend or retract the tines 156. Prior to use, the tines are preferably retracted so that they do not inadvertently become entangled with objects on the water. As the tines are drawn into the sleeve 154, the tines will close towards one another in a tight group. In the retracted position, the tines are preferably completely withdrawn into sleeve 154. In the extended position, the tines spread apart from one another in an arc-like or circular pattern and are prepared to engage the downed game. The operator manipulates the controls of the transmitter to place the tines in contact with the downed game. The curved ends 162 of the tines can be configured to snare or hook the game. Additionally, the operator may partially retract the tines which helps the tips 162 to engage the downed game. Although FIG. 4 illustrates the grasping tines 156 positioned at the rear of the decoy 10, it shall be understood that the grasping tines 156 may be positioned at the front of the decoy 10.

Now referring to FIGS. 9 and 10, the construction and operation of nozzle 114 will be further explained. As shown, nozzle 114 includes a housing 180. Housing 180 includes a chamber 188 for receiving a flow of liquid through line 128. Nozzle element 184 is mounted in the end of the housing 180, and is rotatable as shown in FIG. 10 to direct the flow of fluid in a desired angled direction. The upper surface of nozzle 184 is connected to control rod 182. Control rod 182 is operated by magnetic switch/motor 110. Switch/motor 110 provides the desired angular rotation of control rod 182, based upon transmitted signals from the operator. Alternately, a solenoid or multiple position mechanism may be employed to manipulate the desired angular rotation of control rod 182 based on transmitted signals from the operator. In order to increase the acceleration of liquid exiting the nozzle 184, a plurality of orifices 186 are provided, thus collectively constituting a smaller cross-sectional area for the liquid to exit. These orifices 186 may be sized and numbered to provide the desired amount of increased liquid acceleration. As well understood by those skilled in the art, a constriction produced by a nozzle results in accelerated flow of fluid through the nozzle to enhance the jet propulsive effect. Also, the plurality of orifices provide a screened intake for the reverse operation which prevents objects from becoming entrapped in the lines. In order to prevent contaminants from entering the lines during forward operation, a screen (not shown) is placed over opening 118.

For the second embodiment, additional toggle switches are provided on transmitter 112 to control the jet propulsion.

Forward/reverse toggle 94 controls the solenoids operating the valve 122 for forward or reverse flow of liquid; toggle 96 controls the extended or retracted position of tines 156; toggle switch 98 controls the up/down position of the anchor; toggle switch 100 controls the on or off position for the pump; and horizontally oriented toggle switch 102 controls the left/right pivoting action of the nozzle 114.

The following invention has been described with respect to preferred embodiments; however, other changes and modifications to the invention may be made which are still contemplated within the spirit and scope of the invention.

What is claimed is:

1. A remote controlled game decoy comprising:
   a buoyant body;
   a transmitter remote from said buoyant body for transmitting signals to the decoy for controlling functions of the decoy;
   a receiver disposed within the buoyant body, and responsive to commands from said transmitter;
   control circuitry housed within said buoyant body adjacent said receiver, said control circuitry being electrically coupled to said receiver for generating electrical control signals to control the decoy;
   a propulsive device mounted within said buoyant body and electrically coupled to said control circuitry, said propulsive device being responsive to said electrical control signals for propelling the decoy;
   a dual three-way valve mounted in the buoyant body and communicating with the propulsive device, wherein said dual three-way valve includes first and second control assemblies comprising rotatable cylinders having L-shaped internal passageways, said cylinders having an operating shaft connected to a solenoid that is electronically linked to said control circuitry such that said decoy can be selectively controlled in a forward or reverse direction; and
   a retrieving mechanism mounted within said buoyant body and being selectively deployable to retrieve downed game, said retrieving mechanism including a spool secured within said body, a length of line wound around said spool, a grasping implement attached to a free end of said line, and a retriever motor mechanically coupled to said spool and electrically coupled to said control circuit, said motor causing the spool to rotate in a first direction to allow release of the line from the spool, and the motor causing the spool to rotate in a second direction to rewind the line around said spool.

2. A device, as claimed in claim 1, further including a rudder extending from said buoyant body, and a rudder motor mechanically linked to said rudder and electrically coupled to said control circuitry, said rudder motor responsive to said electrical control signals for manipulating said rudder in a desired orientation.

3. A device, as claimed in claim 1, further including:
   an anchor assembly mounted within said buoyant body, said anchor assembly comprising a spool, a length of line wound around said spool, and a weight attached to a free end of said line; and
   an anchor motor mounted in said buoyant body and mechanically linked to said spool and electrically coupled to said control circuitry, said anchor motor causing said spool to rotate in a first direction to release said anchor, or causing said spool to rotate in a second direction to retrieve said anchor by winding said line around said spool.

4. A device, as claimed in claim 1, wherein said grasping implement includes a hook.

5. A device, as claimed in claim 1, wherein said grasping implement includes a sleeve mounted within said buoyant body, and a plurality of tines received in said sleeve and movable between a retracted position within said sleeve, and an extended position which displaces said tines through said sleeve.

6. A remote controlled game decoy comprising:
   a buoyant body;
   a transmitter remote from said buoyant body for transmitting signals to the decoy for controlling functions of the decoy;
   a receiver disposed within, the buoyant body, and responsive to commands from said transmitter;
   control circuitry housed within said buoyant body adjacent said receiver, said control circuitry being electrically coupled to said receiver for generating electrical control signals to control the decoy;
   a propulsive device mounted within said buoyant body and electrically coupled to said control circuitry, said propulsive device being responsive to said electrical control signals for propelling the decoy; and
   wherein said propulsive device includes a pump, a pump motor mechanically linked to said pump for operating said pump, a passageway including a first opening at a front of said decoy and a second opening at a rear of said decoy, said passageway provided through said body enabling a flow of liquid through said pump, and away from said pump out of said body, resulting in a discharge of liquid out of said body a rate which provides a jet force for propelling said decoy;
   a dual three-way valve mounted in said buoyant body, wherein said dual three-way valve includes first and second control assemblies comprising rotatable cylinders having L-shaped internal passageways, said cylinders having a common operating shaft connected to a solenoid that is electronically linked to said control circuitry such that said decoy can be selectively controlled in a forward or reverse direction, said forward direction achieved when said first and said second control assemblies are set in a forward direction position such that fluid sequentially enters said first opening and flows in a first port and out a second port of said first control assembly before flowing to said pump, and then to said second control assembly and then out said second opening of said decoy, and wherein said reverse direction is achieved when said first and said second control assemblies are set in a reverse direction position such that fluid sequentially enters said second opening and flows in a third port and out said second port of said first control assembly before flowing to said pump, and then to said second control assembly and then out said first opening of said decoy.

7. A device, as claimed in claim 6, further including a nozzle assembly mounted within said buoyant body and communicating with said passageway, said nozzle assembly including a rotatable nozzle element mounted therein for accelerating the discharge of liquid out of said body, and for selectively directing an angle of the discharge of liquid to allow steering of said decoy.

8. A device, as claimed in claim 7, wherein said nozzle element is selectively rotatable through a desired arc of rotation to angle the discharge of liquid, and said nozzle element includes a plurality of spaced orifices aligned with the direction of liquid flow through said nozzle assembly for accelerating the liquid flow.

9. A device, as claimed in claim 6, further including a weighted keel attached to said buoyant body providing stabilizing weight to the buoyant body.

10. A device, as claimed in claim 6, further including:
an opening formed in said buoyant body allowing access to said receiver, said control circuitry, and said propulsive device;
a top cover removably engaged with said opening, said top cover including an overlying edge; and
a sealing member placed between said opening and said top cover for sealing said top cover with respect to said buoyant body, and wherein said overlying edge of said top cover extends beyond said opening and over said buoyant body.

11. A remote controlled game decoy comprising:
a buoyant body;
a transmitter remote from said buoyant body for transmitting signals to the decoy for controlling functions of the decoy;
a receiver disposed within the buoyant body, and responsive to commands from said transmitter;
control circuitry housed within said buoyant body adjacent said receiver, said circuitry being electrically coupled to said receiver generating electrical control signals to control the decoy; and
means for propelling said game decoy, said means for propelling including a pump for inducing flow through said game decoy, a passageway including a first opening at a front of said decoy and a second opening at a rear of said decoy, and a nozzle in fluid communication with said pump for accelerating fluid exiting said game decoy, thus providing jet propulsive force for propelling said decoy;
a dual three-way valve mounted in said buoyant body, wherein said dual three-way valve includes first and second control assemblies comprising rotatable cylinders having L-shaped internal passageways, said cylinders having a common operating shaft connected to a solenoid that is electronically linked to said control circuitry such that said decoy can be selectively controlled in a forward or reverse direction, said forward direction achieved when said first and said second control assemblies are set in a forward direction position such that fluid sequentially enters said first opening and flows in a first port and out a second port of said first control assembly before flowing to said pump, and then to said second control assembly and then out said second opening of said decoy, and wherein said reverse direction is achieved when said first and said second control assemblies are set in a reverse direction position such that fluid sequentially enters said second opening and flows in a third port and out said second port of said first control assembly before flowing to said pump, and then to said second control assembly and then out said first opening of said decoy.

12. A game decoy, as claimed in claim 11, wherein said pump maintains a uni-directional operation.

13. A device, as claimed in claim 11, further including a retrieving mechanism mounted within said buoyant body and being selectively deployable to retrieve downed game.

14. A remote controlled game decoy of the type including a transmitter remote from the game decoy for transmitting signals to the decoy for controlling functions of the decoy, a receiver disposed within a buoyant body of the decoy and responsive to commands from said transmitter, control circuitry housed within the buoyant body and electrically coupled to the receiver for generating electrical control signals to control the decoy, a propulsive device mounted within the decoy and electrically coupled to the control signal, the propulsive device being responsive to the electrical control signals for propelling the decoy, the improvement comprising:
a dual three-way valve mounted in the buoyant body and communicating with the propulsive device wherein said dual three-way valve includes first and second control assemblies comprising rotatable cylinders having L-shaped internal passageways, said cylinders having a common operating shaft connected to a solenoid that is electronically linked to said control circuitry such that said decoy can be selectively controlled in a forward or reverse direction.

15. A remote controlled game decoy of the type including a transmitter remote from the game decoy for transmitting signals to the decoy for controlling functions of the decoy, a receiver disposed within a buoyant body of the decoy and responsive to commands from said transmitter, control circuitry housed within the buoyant body and electrically coupled to the receiver for generating electrical control signals to control the decoy, a propulsive device mounted within the decoy and electrically coupled to the control signal, the propulsive device being responsive to the electrical control signals for propelling the decoy, the improvement comprising:
a nozzle communicating with the propulsive device to accelerate fluid flow through the game decoy thus providing a jet propulsive force to propel the game decoy, and a dual three-way valve mounted in the game decoy and communicating with the propulsive device wherein said dual three-way valve includes first and second control assemblies comprising rotatable cylinders having L-shaped internal passageways, said cylinders having a common operating shaft connected to a solenoid that is electronically linked to said control circuitry such that said decoy can be selectively controlled in a forward or reverse direction.

16. A method of retrieving downed game on a body of water, said method comprising the steps of:
providing a remote controlled decoy having a propulsive device mounted within the decoy, a transmitter remote from the game decoy for transmitting signals to the decoy for controlling functions of the decoy, and a receiver disposed within a buoyant body of the decoy and responsive to commands from the transmitter;
changing the decoy's direction by remotely controlling a dual three-way valve mounted in the decoy, wherein the dual three-way valve includes first and second control assemblies comprising rotatable cylinders having L-shaped internal passageways, the cylinders having a common operating shaft connected to a solenoid that is electronically linked to the receiver such that the decoy can be selectively controlled in a forward or reverse direction;
deploying a retrieving mechanism from the game decoy by unwinding a spool having line mounted thereon, and a grasping implement attached to a free end of the line;
contacting a targeted object with the grasping implement;
recovering the targeted object by rewinding the spool, thus drawing the targeted object toward the game decoy; and
transmitting signals to the game decoy to retrieve the targeted object secured to the decoy.

17. A method of propelling a game decoy, said method comprising the steps of:

providing a game decoy including a propulsive device, and a receiver disposed within game decoy responsive to commands received from a transmitter;

generating a flow of liquid through the game decoy in response to a command from the transmitter, the flow of liquid exiting the game decoy at an accelerated rate resulting in a propulsive force to move the game decoy; and reversing the movement of the game decoy by reversing the direction of flow through the game decoy by remotely controlling a dual three-way valve mounted within the game decoy, wherein the dual three-way valve includes first and second control assemblies comprising rotatable cylinders having L-shaped internal passageways, the cylinders having a common operating shaft connected to a solenoid that is controlled in response to a second command from the transmitter.

18. A remote controlled game decoy comprising:

a buoyant body;

a receiver disposed within said buoyant body, said receiver being responsive to commands from a transmitter and providing electrical control signals in response to said command;

a pump mounted within said buoyant body and electrically coupled to said receiver, said pump being responsive to said electrical control signals;

a dual three-way valve mounted in the buoyant body and in fluid communication with said pump wherein said dual three-way valve includes first and second control assemblies comprising rotatable cylinders having L-shaped internal passageways, said cylinders having a common operating shaft connected to a solenoid that is electronically linked to said receiver such that said decoy can be selectively controlled in a forward or reverse direction; and a pivoting output nozzle coupled to said buoyant body and responsive to said electrical control signals, said pump and $aid pivoting output nozzle cooperating to provide directed locomotion for said buoyant body to propel said buoyant body.

19. A method of retrieving downed game in a body of water, said method comprising the steps of:

providing a remote controlled decoy having a propulsive device mounted within the decoy, a transmitter remote from the game decoy for transmitting signals to the decoy for controlling functions of the decoy, and a receiver disposed within a buoyant body of the decoy and responsive to commands from the transmitter;

changing the decoy's direction by remotely controlling a dual three-way valve mounted in the decoy, wherein the dual three-way valve includes first and second control assemblies comprising rotatable cylinders having L-shaped internal passageways, the cylinders having a common operating shaft connected to a solenoid that is electronically linked to the receiver such that the decoy can be selectively controlled in a forward or reverse direction;

deploying a retrieving mechanism from the game decoy by extending a plurality of opposing retractable tines, the tines including curved ends;

contacting a targeted object with tines;

recovering the targeted object by retracting the tines to draw the targeted object toward the game decoy; and transmitting signals to the game decoy to retrieve the targeted object secured to the decoy.

* * * * *

UNITED STATES PATENT AND TRADEMARK OFFICE
CERTIFICATE OF CORRECTION

PATENT NO.    : 6,601,333 B2                                     Page 1 of 1
DATED         : August 5, 2003
INVENTOR(S)   : Cicoff et al.

It is certified that error appears in the above-identified patent and that said Letters Patent is hereby corrected as shown below:

Column 10,
Line 14, please remove the comma "," after "within."
Line 31, please insert -- at -- after "body."

Column 11,
Line 24, please insert -- for -- after "receiver."

Column 14,
Line 5, please delete "$aid" and replace it with -- said --.

Signed and Sealed this

Eighteenth Day of November, 2003

JAMES E. ROGAN
*Director of the United States Patent and Trademark Office*